April 23, 1940.　　　R. W. BAILY　　　2,198,148
VIBRATORY APPARATUS
Filed Sept. 7, 1937　　　2 Sheets-Sheet 2
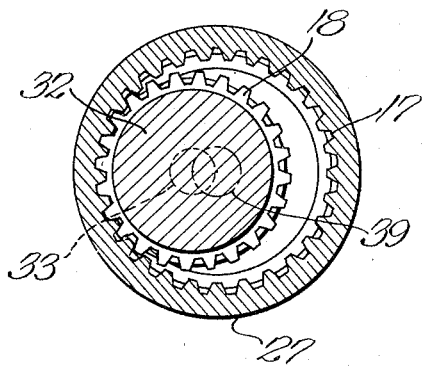
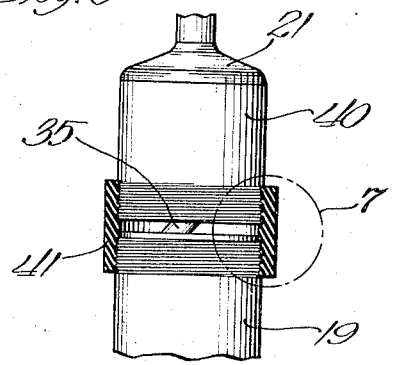
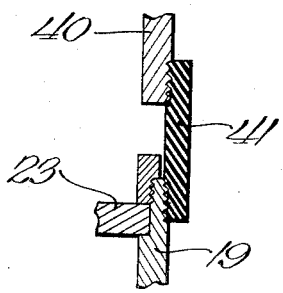
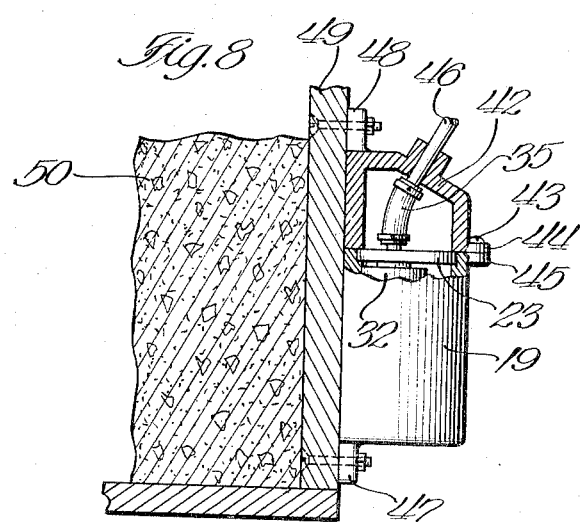
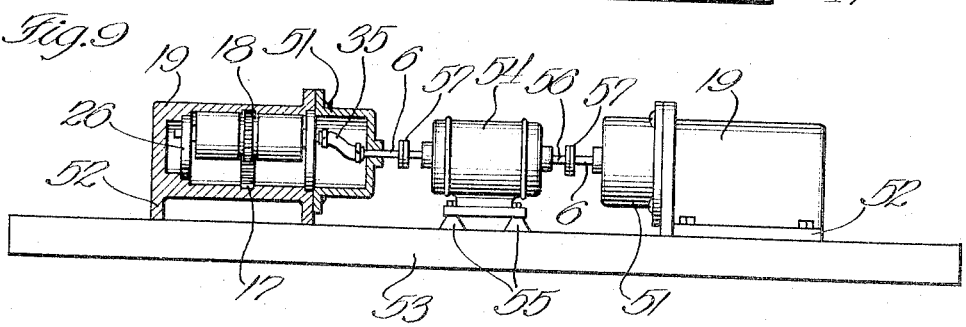
INVENTOR.
Robert W. Baily
BY Bair & Freeman
ATTORNEYS Patented Apr. 23, 1940

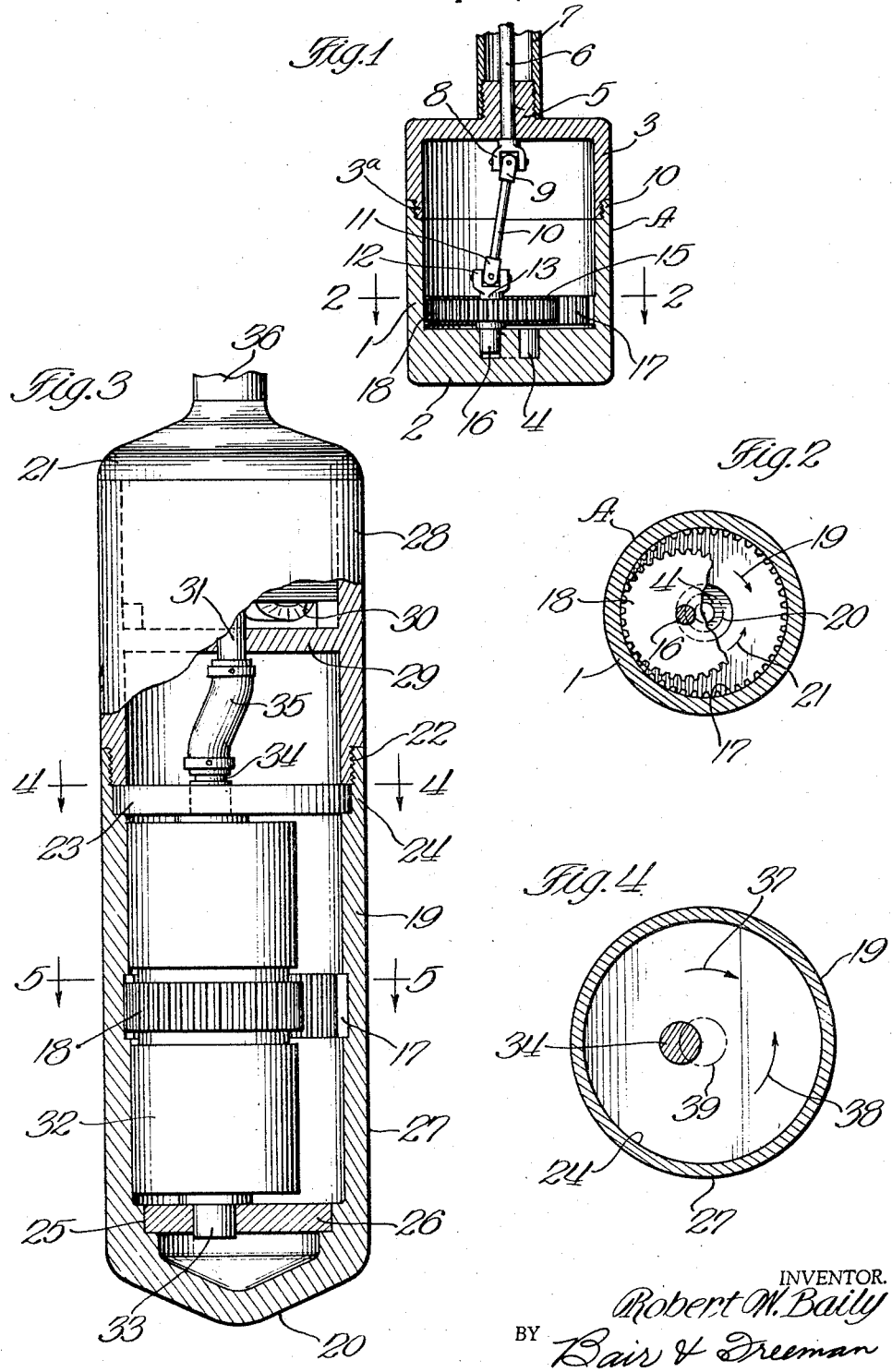

2,198,148

UNITED STATES PATENT OFFICE 2,198,148

VIBRATORY APPARATUS

Robert W. Baily, Narberth, Pa.

Application September 7, 1937, Serial No. 162,822

7 Claims. (Cl. 259—1)

My present invention relates to an apparatus whereby vibrations may be transmitted to materials, such for example as concrete.

It is my object generally to provide an apparatus and a method for producing vibrations.

My invention relates generally to an apparatus in which a weight or mass is rotated around a center of rotation for vibrating a holder of some sort.

One of my principal objects is to provide a method for accomplishing the results hereinafter more fully set forth.

Generally it is an object to provide a simple vibrating apparatus including an actuating member and a vibrating member and a vibrated member, the parts being so associated that the frequency of vibrations of the vibrated and vibrating members is greater than the angular speed of the actuating member.

Another object is to provide a vibratory apparatus having parts so arranged that the ratio of the frequency of vibration to the rotary speed of the actuating member may be easily changed to another ratio by the substitution of easily interchangeable parts.

Another purpose of the present invention is to provide an apparatus in which the amplitude of vibration may be greater than in apparatus heretofore available.

Still another object is to provide an apparatus in which the amplitude of vibration may be less and the energy output simultaneously higher than in other apparatus hitherto available.

An additional purpose is to provide apparatus in which the frequency of vibration may be economically higher than in other apparatus heretofore available.

An additional object is to provide an apparatus including a body to be vibrated, the vibrator member and a rotary actuating member so associated together that the frequency of vibration of the body will exceed the rotary speed of the actuating means.

A further object is to provide a method and apparatus for obtaining high frequencies of vibration simultaneously with high or low amplitudes of movement of the vibrator and simultaneously with high or low energy outputs, according to the design selected while using a prime mover and power transmission apparatus of relatively low speed.

Another object of my invention is to provide a vibrator apparatus containing a weight whose center of gravity revolves around the axis of a housing and in which the axis of a power shaft actuating weight need not coincide with nor be parallel to the axis of the weight or the axis of the housing.

A further object is to provide an apparatus of the nature above mentioned in which means may be provided to eliminate the transmission of destructive vibrations from the vibrating parts of the apparatus to the prime mover.

Another purpose of this invention is to furnish an apparatus for vibrating a form or container for plastic material and for vibrating such material, the apparatus having a rotary prime mover, power transmission means and a vibrating member, the parts being so associated together that the frequency of vibration of the vibrated member exceeds the frequency of the rotation of the prime mover, thereby imparting vibrations to the plastic material at frequencies higher than can be conveniently attained by other means.

With these and other objects in view, my method and apparatus consist of the steps and structures hereinafter set forth, pointed out in my claims and illustrated in the drawings, in which:

Figure 1 is a vertical sectional view of one form of an apparatus for obtaining high frequency vibrations, high and low amplitudes of movement and high and low energy outputs simultaneously with low speed or input power transmission means.

Figure 2 is a horizontal, sectional view taken on the line 2—2 of Figure 1.

Figure 3 is a vertical sectional view partly in side elevation of another form in which my invention may be embodied.

Figure 4 is a detailed, sectional view taken on the line 4—4 of Figure 3.

Figure 5 is a detailed sectional view taken on the line 5—5 of Figure 3.

Figure 6 is a side elevation of a different form of housing used in connection with my vibrating mechanism, the housing being made in sections connected by a connecting, shock absorbing sleeve.

Figure 7 is a detailed, vertical, sectional view of the portion in circle on Figure 6.

Figure 8 is a side elevation, parts being shown in section and parts being broken away, illustrating a form of my invention adapted to be mounted on a form.

Figure 9 is a side elevation, parts being shown in section, illustrating a form of my invention including a screed such as may be used in vibrating pavements.

Generally speaking, I prefer to embody my invention in a housing, a vibrating member therein and a means for imparting rotation to the vibrating member, the vibrating member being mounted to travel around the axis of rotation of the means.

The construction and operation of my vibrator may be made clearer if I first refer to my co-pending application on a Submersible Vibrator, Serial No. 748,384, issued as Patent No. 2,148,722 on February 28, 1939, in which an off-center weight is rotated in a housing around the axis of the housing and around the axis of a drive shaft or the like. Attention is also called to my co-pending application No. 256,249.

In Figures 1 and 2 I have shown a rather simple form in which my invention may be embodied. In this form of my device, there is shown a cylindrical hollow housing 1, closed at what may be called its lower end by an integral end member 2 and closed at its other end by means of the cap 3, the parts being connected by coacting threaded portions 1a and 3a.

On the interior of the housing which the end member 2 is provided with an annular groove 4 concentric with the long axis 6—a of the housing. On the cap 3 is a boss 5, a driving shaft 6 extends through the boss 5 and the cap 3 to the interior of the housing formed by the housing member 1 and cap 3. A handle 7, flexible or otherwise, may be connected to the boss 5. For convenience, I call the housing composed of the members 1 and 3, the housing A.

On the end of the drive shaft 6 inside the housing A, is a universal joint member 8 which coacts with a universal joint member 9 on the upper end of the shaft 10 which has on its lower end a universal joint member 11 connected to another universal joint member 12 on the shaft 13 of the weight 15. The shaft 13 extends downwardly from the weight 15 as indicated at 16 and travels in the groove 4. The circumference of the weight 15 engages and coacts with the wall of the housing A. In this particular illustration of my invention I have shown the wall provided on its inside with teeth 17 which mesh with teeth 18 on the circumference of the weight 15.

When the drive shaft 6 begins to rotate in the direction indicated by the arrow 19 in Figure 2, the weight 15 will revolve in the same angular direction and on account of the universal joint connection will rotate at an angular rate of speed identical with that of the shaft 6. Also the weight 15 will roll around the interior of the housing 1. The teeth 18 engage with the teeth 17. I shall describe the parts as though the housing were in the upright position shown in Figure 1. The axis of the weight 15 will travel in the circular path 20 shown in Figure 2 and in the angular direction indicated by the arrow 21.

It will be noted that the angular rotation of the axis of the weight is in one direction and the angular rotation of the axis of the circle 20 is in another direction.

The striking feature of operation of this device is the fact that vibrations are imparted to the housing 1 with a frequency substantially greater than the rotations of the shaft 6 and the weight 16, on its own axis.

To explain the operation of the apparatus mathematically, I adopt the following designations:

$d$ is the diameter of the pitch circle of the teeth 18 of the weight 15, in feet.

$D$ is the diameter of the pitch circle of the teeth 17 of the housing 1, in feet.

$P$ is the number of revolutions per minute of the power shaft 6, and of the weight 15 about its own axis 16.

$N$ is the number of revolutions per minute of the axis 16 of the weight 15 about the axis 6—a of the housing 1.

$M$ is the mass per unit of volume of the weight 15.

$L$ is the thickness of the weight 15.

$CFa$ is the centrifugal force generated by the weight 16 in the revolution of its axis 16 around the axis 6—a of the housing 1.

$Ra$ is the radius of the circular path 20.

$Wa$ is the weight of the body 15.

If angular rotation in a clockwise direction be considered positive, and counterclockwise rotation be considered negative, Then—

(1) $$N=\frac{\frac{d}{D}}{1-\frac{d}{D}}P=\frac{d}{D-d}P$$

If $D$ be assumed to equal 4 units, and $d$ 3 units, it will be seen that for those proportions the weight 15 will pass three times about the axis 6—a of the housing for each revolution of the power shaft 6.

The centrifugal force developed is shown by the equation:

(2) $$CFa=.000341\ Wa\ Ra\ N^2$$

also (3) $$Wa=ML\frac{pi}{4}D^2$$

(3½) $$Ra=\frac{D-d}{2}$$

and (4) $$N=\frac{d}{D-d}P$$

whence (5) $$CFa=\frac{.000341\ pi}{8}ML\frac{d^4}{D-d}P^2$$

From this it is seen that as $d$ increases and more closely approaches $D$, the centrifugal force generated by the weight 15 increases almost as the fourth power of its diameter $d$.

Also the number of revolutions per minute $N$ of the axis 16 about the axis 6—a increases to infinity when $d$ equals $D$.

It may be in order to compare the operation of my apparatus with a conventional type of vibrator heretofore in use.

Such a vibrator is shown, for instance, in my Patent No. 2,148,722, issued February 28, 1939. For the purposes of illustration, this conventional type of vibrator has a housing within which a weight is rotated, the center of gravity being outside the axis of rotation. In the illustrative instance of my prior application, the weight is half a cylinder rotated around the axis of the same cylinder. My arrangement gives a maximum mass on one side of the axis of rotation, whereby there will be produced the maximum centrifugal force. If we assume that the diameter of the weight is equal to the internal diameter of the half cylinder, and the thickness (L) is equal to that of the weight 15 of Figure 1 and the material to be of identical mass, then let the parts of the weight of the conventional vibrator be designated thus—

$D$=diameter.

$Rb$ the distance of the center of gravity G from its axis of rotation 30.

$CFb$ the centrifugal force developed by the weight 31 rotating about its axis 30.

$Wb$ the weight of the body 31.

Then:

(6) $$Wb = ML\frac{pi}{8}D^2$$

And:

(7) $$Rb = \frac{2D}{pi} = .4244D$$

And:

(8) $$CFb = \frac{.000341}{12} pi M L D^3 P^2$$

Referring now to Figures 1 and 2, we wish to find the diameter $d$ of the weight 15 which will produce the same total weight as that of the conventional vibrator:

(9) $$Wa = \frac{ML pi d^2}{4} = Wb = \frac{ML pi D^2}{8}$$

Whence

(10) $$d^2 = \frac{D^2}{2}$$

And:

(11) $$d = .7071D \text{ and } 1.414d = D$$

Now the number of revolutions $N$ of the axis of weight 15 about the axis 6—$a$ is determined by the Equation 4 foregoing. Whence—

(12) $$N = \frac{d}{D-d}P$$

and substituting from (11)—

(13) $$N = 2.416P$$

Also

(14) $$Ra = \frac{D-d}{2}$$

To find the centrifugal force generated by weight 15 having the same total mass as conventional weight with identical angular speeds of power shafts, we find that, by substituting the values above in the preceding equations:

(15) $$CFa = \frac{(.000341) \times (.1464) \times (2,416)^2 pi M L D^3 P^2}{8}$$

Also—

(16) $$\frac{CFa}{CFb} = \frac{(15) \text{ equation}}{(8) \text{ equation}}$$

Whence:

(17) $$CFa = 2.012 \times CFb$$

This means that if the weights are equal the apparatus of Figure 1 will produce more than twice the centrifugal force of the conventional apparatus, and will produce a frequency of more than twice the frequency of that apparatus.

By the same formulae it can be shown that to produce equal centrifugal forces, the weight 15 of Figure 1 should have a diameter $d = .555 \times D$ and for this condition—

(18) $$N = 1.243 \times P$$

which means that the apparatus of Figure 1 will have about twenty-five per cent higher frequency than the conventional apparatus when the centrifugal forces are identical.

My invention may be embodied in a variety of forms. Different ones of these forms are illustrative of the flexibility of the invention, broadly considered.

The illustrations herein also show how the invention may be adapted to a variety of structures for accomplishing different purposes.

In Figures 3, 4, and 5 I have shown still a different form in which my invention may be embodied. The housing is indicated at 19 and it has the closed lower end 20 and a cover cap 21. The housing is made in two sections threadedly connected together at 22.

The rotating disc 23 is received in the rabbet 24 for rotation. On the bottom 20 is a rabbet 25 in which is rotatably received a similar somewhat smaller disc 26. The lower section of the housing is indicated at 27 and the upper section at 28. The section 28 is originally open at both ends and has a central horizontal partition 29. In the compartment thus provided above the partition 29 is mounted a motor 30 which operates a vertical shaft 31 extending through the partition 29. In the compartment formed between the discs 23 and 26 is a cylindrical weight 32 having spindles 33 and 34 journaled off-center in the respective discs 23 and 26. A flexible shaft 35 connects the shaft 31 and the spindle 34. The cap 21 has the handle 36 and it will be understood that actuating fluid conductors are extended through the handle 36 and cap 21 to the motor 30.

When the shaft 31 rotates in the angular direction illustrated by the arrow 37 in Figure 4, the weight 32 will rotate in the same angular direction and will travel in a cylindrical path in the direction of the arrow 38 around the circle 39.

In Figures 6 and 7 is shown another embodiment of my invention. Here the housing is made up of a lower section 19 and an upper section 40, the upper section 40 having the removable cap 21.

The housing members 19 and 40 are externally screw threaded at their adjacent ends and are connected by an interiorly screw threaded flexible connecting sleeve 41 which is resilient and will dampen the transmission of vibrations from the housing member 19 to the housing member 40. The thought is that the housing member 40 will contain the motor as in the case of Figure 3 and the transmission of vibrations to the motor will thus be substantially prevented. (See Baily Patent No. 1,876,271.)

As a matter of fact, the housing shown in Figures 6 and 7 may contain any of the mechanisms illustrated and heretofore described.

In Figure 8 I have shown my vibrator mounted in a type of apparatus which can be conveniently mounted on the side forms as used in making concrete. Generally, I have illustrated the type of device shown in Figure 3 but various forms of the vibrator weight and operating mechanism can be used. In this form of the device, the casing 19 has the cap 42 fastened to it by means of screws 43 and flanges 44 and 45. The weight 32, similar to the weight 32 of Figure 3, already mentioned, is operated by a flexible shaft 35 which in turn is connected with a driving shaft 46 extending through the cap 42. One side of the housing 19 and one side of the cap 42 are flattened and provided with flanges 47 and 48 by which the device may be bolted or clamped to a form 49 for concrete 50.

This arrangement illustrates the manner in which the axis of the power shaft 46 may be at an angle with the axis of the housing 19, and with the axis of the weight 32.

Where this kind of a vibrator is used, vibrations are transmitted to the form which holds the concrete instead of directly to the concrete.

The feature of creating vibrations of higher frequency than the speed of rotation of the drive shaft is here retained.

In Figure 9, the kind of vibrator shown for instance in Figure 8 is mounted in a housing 19 and has a cap 51, all arranged horizontally. The housing is provided with a base 52 mounted on a screed or vibrating member 53. In the particular embodiment of the device shown in Figure 9, I have shown a plurality of these vibrators with a prime mover 54 arranged between them mounted by shock absorbing means 55 on the screed or the like 53, with a shaft 56 extending in both directions and connected by flexible couplings 57 with the operating shafts 6 with respect to the vibrators.

When the drive shaft 56 of the prime mover is rotated the weights 32 in both housings 19 are rotated in cylindrical paths about the axis of the housings 19.

The vibrations of the housings 19 may be transmitted to the screed or vibrating member 53 or to material in contact therewith at frequencies which exceed the speed of rotation of the prime mover shaft 56.

If desired, the positions of the weights in the respective housings 19 of Figure 9 may be arranged so that they operate synchronously for imparting vibrations in the same direction and at the same time to the screed 53.

A device of this kind has a great advantage and has great utility, particularly in the fact that vibrations may be imparted at a greater frequency than the speed of rotative speed of the prime mover.

Another advantage, of course, lies in the flexibility of a device which can be embodied in such a great variety of forms for accomplishing the primary purpose. It will be seen that I have provided a method for imparting vibrations to vibratable bodies by subjecting them to vibrations from a rotating weight which is at the same time caused to travel in a path around the axis of the weight.

Some changes may be made in the arrangement and construction of the various parts of my vibratory apparatus without departing from the real spirit and purpose of my invention, and it is my intention to cover by my claims, any modified forms of structure or use of mechanical equivalents, which may be reasonably included within their scope.

I claim as my invention:

1. In a vibratory apparatus, a housing with a weight therein, a drive shaft entering the housing and arranged to transmit torque to the weight to rotate said weight on its axis at the angular rate of rotation of the shaft, the center of gravity of the weight rotating about the axis of the housing in an angular direction opposite to the direction of rotation of the shaft, the weight and the interior of the housing having coacting engaging toothed surfaces, and means to maintain such engagement, the weight having a diameter less than the diameter of the coacting surface of the housing but greater than the radius thereof, the center of gravity of the weight revolving about the axis of the housing at an angular rate greater than that of the shaft, whereby vibrations are imparted to the housing at a frequency in excess of the rate of rotation of the shaft.

2. In a vibratory apparatus, a housing with a weight therein, a drive shaft entering the housing and arranged to transmit torque to the weight to rotate said weight on its axis at the angular rate of rotation of the shaft, the center of gravity of the weight rotating about the axis of the housing in an angular direction opposite to the direction of rotation of the shaft, the weight and the interior of the housing having coacting engaging toothed surfaces, and means to maintain such engagement, the weight having a diameter less than the diameter of the coacting surface of the housing but greater than the radius thereof, the center of gravity of the weight revolving about the axis of the housing at an angular rate greater than that of the shaft, whereby vibrations are imparted to the housing at a frequency in excess of the rate of rotation of the shaft, a prime mover associated with the vibratory apparatus and propelling the drive shaft, and damping means interposed between the prime mover and the vibratory apparatus dampening the transmission of destructive vibrations from the vibratory apparatus to the prime mover.

3. In a vibratory apparatus, a housing with a weight therein, a drive shaft entering the housing and arranged to transmit torque to the weight to rotate said weight on its axis at the angular rate of rotation of the shaft, the center of gravity of the weight rotating about the axis of the housing in an angular direction opposite to the direction of rotation of the shaft, the weight and the interior of the housing having coacting engaging toothed surfaces, and means to maintain such engagement, the weight having a diameter less than the diameter of the coacting surface of the housing but greater than the radius thereof, the center of gravity of the weight revolving about the axis of the housing at an angular rate greater than that of the shaft, whereby vibrations are imparted to the housing at a frequency in excess of the rate of rotation of the shaft, a prime mover associated with the vibratory apparatus and propelling the drive shaft, and a connection between the prime mover and the vibratory apparatus controlling the position of the vibratory apparatus relative to the position of the prime mover.

4. In a vibratory apparatus, a housing with a weight therein, a drive shaft entering the housing and arranged to transmit torque to the weight to rotate said weight on its axis at the angular rate of rotation of the shaft, the center of gravity of the weight rotating about the axis of the housing in an angular direction opposite to the direction of rotation of the shaft, the weight and the interior of the housing having coacting engaging toothed surfaces, and means to maintain such engagement, the weight having a diameter less than the diameter of the coacting surface of the housing but greater than the radius thereof, the center of gravity of the weight revolving about the axis of the housing at an angular rate greater than that of the shaft, whereby vibrations are imparted to the housing at a frequency in excess of the rate of rotation of the shaft, a prime mover associated with the vibratory apparatus and propelling the drive shaft, and damping means interposed between the prime mover and the vibratory apparatus dampening the transmission of destructive vibrations from the vibratory apparatus to the prime mover, said damping means controlling the position of the vibratory apparatus relative to the position of the prime mover.

5. In a vibratory apparatus, a member to be vibrated, a plurality of housings associated with the member, each housing having a weight therein, a drive shaft entering the housing arranged to transmit torque to the weight to rotate the weight on its axis at approximately the angular rate of rotation of the shaft, the center of gravity of the weight rotating about the axis of the housing in an angular direction opposite to the direction of rotation of the shaft, the weight and the housing having coacting engaging toothed surfaces, and means to maintain such engagement, the weight having a diameter less than the diameter of the coacting surface of the housing but greater than the radius thereof, the center of gravity of the weight revolving about the axis of the housing at an angular rate greater than that of the shaft, each housing imparting vibrations to the member at frequencies in excess of the rates of rotation of the respective drive shafts.

6. An apparatus as described in claim 5, wherein the respective drive shafts of the housings are synchronized whereby all vibrations transmitted to the member from the housings are simultaneously in similar directions.

7. In an apparatus as described in claim 5, a prime mover for rotating the drive shafts, the mounting of said prime mover arranged to dampen the transmission of destructive vibrations to the prime mover.

ROBERT W. BAILY.